US009911107B2

(12) United States Patent
Li et al.

(10) Patent No.: US 9,911,107 B2
(45) Date of Patent: Mar. 6, 2018

(54) AUTOMATED SECURE CHECK-OUT AND DROP-OFF RETURN OF PRODUCTS USING MOBILE DEVICE

(75) Inventors: Hong Li, El Dorado Hills, CA (US); Eddie Balthasar, Folosm, CA (US); Taeho Kgil, Beaverton, OR (US); Anand Rajan, Beaverton, OR (US); Mark H. Price, Placitas, NM (US)

(73) Assignee: INTEL CORPORATION, Santa Clara, CA (US)

( * ) Notice: Subject to any disclaimer, the term of this patent is extended or adjusted under 35 U.S.C. 154(b) by 338 days.

(21) Appl. No.: 13/996,363

(22) PCT Filed: Feb. 27, 2012

(86) PCT No.: PCT/US2012/026684
§ 371 (c)(1),
(2), (4) Date: Apr. 14, 2014

(87) PCT Pub. No.: WO2013/130031
PCT Pub. Date: Sep. 6, 2013

(65) Prior Publication Data
US 2014/0316919 A1 Oct. 23, 2014

(51) Int. Cl.
*G06Q 30/00* (2012.01)
*G06Q 20/18* (2012.01)
(Continued)

(52) U.S. Cl.
CPC ........... *G06Q 20/18* (2013.01); *G06Q 20/202* (2013.01); *G06Q 20/203* (2013.01);
(Continued)

(58) Field of Classification Search
CPC .................................................. G06Q 30/0281
(Continued)

(56) References Cited

U.S. PATENT DOCUMENTS 7,680,702 B1    3/2010  Oakes, III
8,078,507 B1 *  12/2011 Rao ........................ G06Q 30/06
                                                    705/26.62
(Continued)

FOREIGN PATENT DOCUMENTS

KR    2010-0079456 A    7/2010
KR    2011-0127860 A    11/2011
(Continued)

OTHER PUBLICATIONS

Li, et al., "Smart Device Assisted Commerce," U.S. Appl. No. 13/992,380, filed Jun. 7, 2013, 37 pages.
(Continued)

Primary Examiner — Hunter Wilder
(74) Attorney, Agent, or Firm — Grossman, Tucker, Perreault & Pfleger, PLLC

(57) ABSTRACT

Generally, this disclosure describes a method and system for automated check-out and drop-off return of products using a mobile device. A method may include purchasing at least one product of a plurality of products wherein each product is located at a respective associated product location in a store that sells the plurality of products and a point of sale of each purchased product corresponds to the respective associated product location.

18 Claims, 5 Drawing Sheets

(51) Int. Cl.
   *G06Q 30/06*    (2012.01)
   *G07F 17/10*    (2006.01)
   *G07G 1/14*     (2006.01)
   *G06Q 20/20*    (2012.01)
   *G06Q 20/32*    (2012.01)
   *G06Q 30/02*    (2012.01)

(52) U.S. Cl.
   CPC ....... *G06Q 20/208* (2013.01); *G06Q 20/3278* (2013.01); *G06Q 30/06* (2013.01); *G07F 17/10* (2013.01); *G07G 1/14* (2013.01); *G06Q 30/0281* (2013.01)

(58) Field of Classification Search
   USPC .......................................... 705/346
   See application file for complete search history.

(56) References Cited

U.S. PATENT DOCUMENTS

| | | | | |
|---|---|---|---|---|
| 9,298,954 | B1* | 3/2016 | Ewing | G06K 7/0008 |
| 2003/0019929 | A1* | 1/2003 | Stewart | G06K 7/0008 |
| | | | | 235/385 |
| 2004/0016620 | A1* | 1/2004 | Davis | G07F 7/069 |
| | | | | 194/205 |
| 2005/0190060 | A1* | 9/2005 | Clancy | G08B 13/246 |
| | | | | 340/572.9 |
| 2007/0295799 | A1* | 12/2007 | Chibel | G06Q 10/08 |
| | | | | 235/375 |
| 2008/0142589 | A1* | 6/2008 | Cummings | G06Q 30/06 |
| | | | | 235/383 |
| 2009/0055278 | A1 | 2/2009 | Nemani | |
| 2010/0211506 | A1 | 8/2010 | Chang et al. | |
| 2011/0173082 | A1* | 7/2011 | Breitenbach | G06Q 10/06311 |
| | | | | 705/26.41 |
| 2011/0231285 | A1 | 9/2011 | Englund et al. | |
| 2013/0132279 | A1* | 5/2013 | Nordstrom | G08C 19/00 |
| | | | | 705/44 |
| 2014/0188658 | A1 | 7/2014 | Li et al. | |

FOREIGN PATENT DOCUMENTS

| | | |
|---|---|---|
| WO | 2013095333 | 6/2013 |
| WO | 2013095440 | 6/2013 |
| WO | 2013/130031 A1 | 9/2013 |

OTHER PUBLICATIONS

International Preliminary Report on Patentability and Written Opinion received for PCT Patent Application No. PCT/US2012/026684, dated Sep. 12, 2014, 7 pages.

European Search Report received for PCT Application No. PCT/US2012/026684, dated Sep. 8, 2015, 6 pages.

International Search Report and Written Opinion received for PCT application No. PCT/US2012/026684, dated Mar. 4, 2013, 10 Pages.

Zimmerman, "Mobile Checkout Devices Let People Scan and They Shop", downloaded from http://online.wsj.com/article/SB10001424052748703421204576329253050637400.html#articleTabs%3Dcomments. May 18, 2011.

* cited by examiner

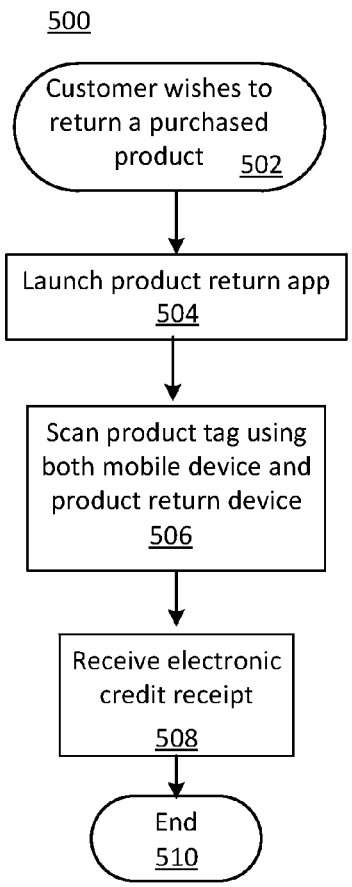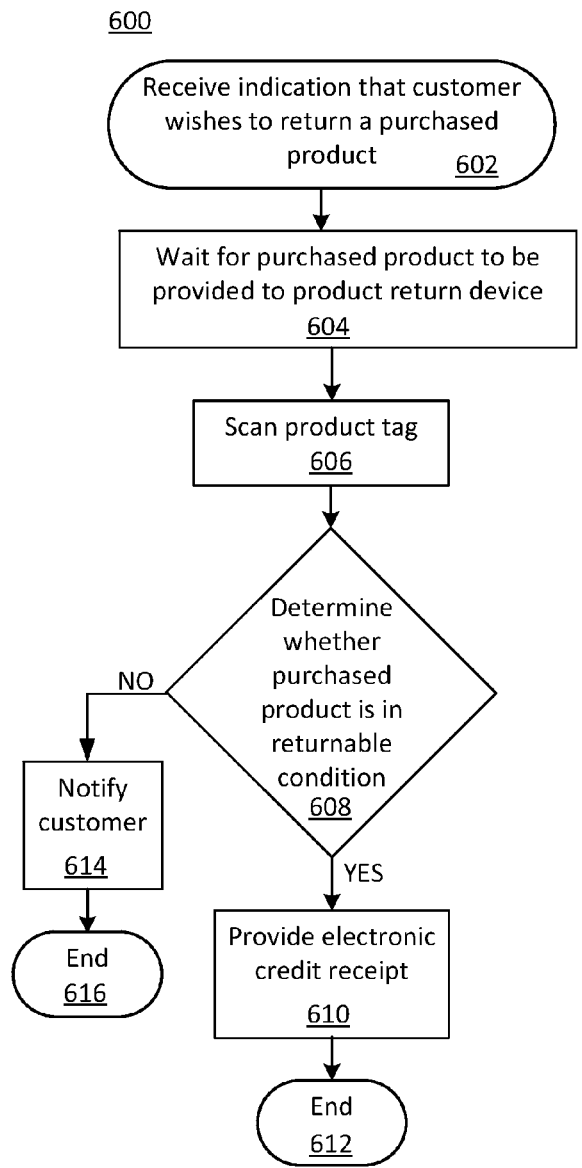
FIG 5
FIG 6

AUTOMATED SECURE CHECK-OUT AND DROP-OFF RETURN OF PRODUCTS USING MOBILE DEVICE

FIELD

This disclosure relates to check-out and drop-off return of products, more particularly to automated secure check-out and drop-off return of products using a mobile device.

BACKGROUND

Today, when a shopper buys product(s) from a store, he/she will typically put all the products to be purchased in the shopping cart and proceed to a centralized checkout register to pay for the products. The centralized checkout may be staffed by a store employee who performs the checkout process or may be automated, allowing the shopper to perform the checkout process. Often, there will be a checkout line and the shopper will then wait in line to purchase the products. Time spent by a shopper in the checkout line typically depends on a total duration of a plurality of activities for each of a plurality of other shoppers that are ahead of the shopper in the checkout line. The activities may include unloading each shopper's cart (or basket), placing product(s) to be purchased on a conveyer belt, scanning each product (by the shopper or a store staff person), bagging the scanned product(s), reloading the cart with the bagged product(s) and paying for the product(s). At least a portion of these activities are performed serially both for a specific shopper and between the plurality of shoppers in the checkout line. When the shopper walks out of the door, if there is any item in the bag that the checkout register missed, it may trigger an alarm, which can be embarrassing for the shopper. On the other hand, if a customer wants to return a product, he/she will need to go to customer service and wait in line for the next available staff member. Waiting in line is undesirable resulting in a less than ideal customer experience.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 5 illustrates a flowchart of exemplary operations of a mobile device configured for automated product return consistent with an embodiment of the present disclosure; and FIG. 6 illustrates a flowchart of exemplary operations of a store server configured for automated product return consistent with an embodiment of the present disclosure.

Figure 1A:
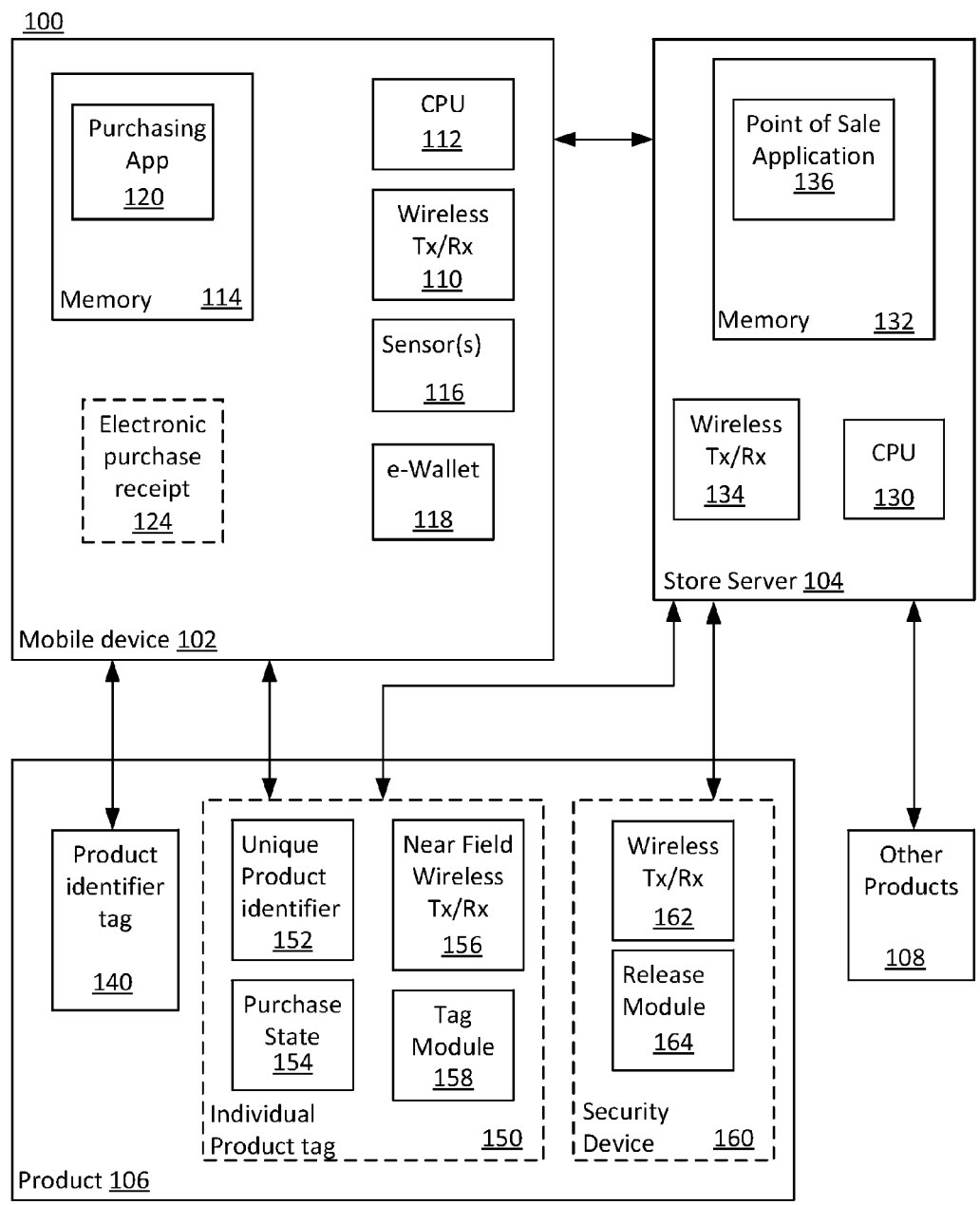
FIG. 1A illustrates an automated product purchasing system consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure describes a method and system for automated check-out (i.e., automated product purchasing) and drop-off return (i.e., automated product return) of products using a mobile device. The purchase transaction and product return are configured to be performed using the shopper's mobile device. The method and system are configured to allow a shopper to purchase one or more products with a point of sale (PoS) corresponding to a respective location of each purchased product. Point of sale corresponds to a location where a purchase transaction occurs. For example, for a product located on a store shelf, the point of sale may be adjacent to the store shelf that contains the product. In other words, if a plurality of products are purchased and each product is located in a respective location, then there will be a plurality of points of sale with one point of sale corresponding to each respective location.

A shopper may utilize his/her mobile device to scan a product identifier tag (e.g., barcode) to identify the product to be purchased. The mobile device is configured to communicate with a cash register application running on a store server. The cash register application is configured to receive the product identity and payment information from the mobile device and to receive and confirm electronic payment for the product. The cash register application may be configured to update a purchase state of the product included in an individual product tag and/or transmit a release command to a security device attached to the product. The purchased product may then be placed in the shopper's cart.

In this manner, the shopper may purchase the product with the point of sale corresponding to the product location. If the shopper purchases a plurality of different products, the process may be repeated at each different product location. If the shopper purchases a plurality of the same product, the plurality of the same product may be purchased at the point of sale corresponding to the one product location of the plurality of the same product. Thus, a common checkout location for all of the plurality of products and the typical associated lines of other shoppers waiting to checkout may be avoided.

A method and system consistent with the present disclosure may be further configured to facilitate automated drop-off of a product to be returned. Automated drop-off of a product to be returned corresponds to providing the product to a product return facility wherein the return process is performed by a customer, the customer's mobile device, and a product return device without requiring participation of a customer service representative. Automated drop-off and return may be limited to return of products that meet certain condition requirements (e.g., unopened product packages), as described herein.

FIG. 1A illustrates an automated check-out system 100 consistent with various embodiments of the present disclosure. The system 100 generally includes a mobile device 102, store server 104 and a product 106. The system may include a plurality of other products 108. "Mobile device" as used herein means any handheld computing device, including, but not limited to, mobile telephones, smartphones, tablet computers, notebook computers, ultraportable computers, ultramobile computers, netbook computers, subnotebook computers, personal digital assistants, enterprise digital assistants, mobile internet devices and personal navigation devices. The store server 104 may be physically located in a store or it may correspond to a web-based service processing on one or more servers located remote from the store (e.g., cloud computing). The product 106 may be located on a shelf in the store. A location adjacent the shelf corresponds to a location of the product, i.e., product location. The plurality of other products 108 may be located on the same shelf, other shelves and/or included in displays of products that are not on shelves in the store.

Product 106 includes a product identifier tag 140 and may include an individual product tag 150 and/or a security device 160. For example, relatively less expensive products (e.g., pencils) may not include individual product tag 150 and may not include security device 160. In another example, relatively more expensive items (e.g., televisions) may include both individual product tag 150 and security device 160. In another example, a product priced between the two prior examples may include the individual product tag 150 but not the security device 160. The product identifier tag 140 and individual product tag 150 may be attached to product 106 and/or may be included in a package that includes product 106. The security device 160 may be removably attached to the product 106 or the package that includes the product 106.

The product identifier tag 140 is configured to identify the product 106, e.g., for pricing and/or inventory purposes. For example, the product identifier tag 140 may be a barcode. The barcode may be a one-dimensional barcode that includes lines of varying widths and spacing (e.g., Universal Product Code (UPC)) or may be a two-dimensional matrix barcode (e.g., Quick Response (QR) code). The product identifier tag 140 may not be unique. In other words, a plurality of the same products may have the same product identifier tag 140. For example, each pencil of a particular brand and type of pencils may have the same barcode.

The individual product tag 150 is configured to uniquely identify the product 106 and is configured to indicate whether the product 106 has been purchased. The individual product tag 150 may include a unique product identifier 152, a purchase state 154, a near field wireless Tx/Rx 156 and a tag module 158. The unique product identifier 152 is configured to uniquely identify the product 106 (in the store). In other words, each product of a plurality of the same product may be uniquely identified based on the unique product identifier 152.

The purchase state 154 is configured to indicate whether the product 106 has been purchased. During a purchasing operation, the purchase state 154 is configured to change from indicating not purchased to indicating purchased (i.e., a purchase transaction is complete). In some embodiments, the purchase state 154 may be included in unique product identifier 152. The near field wireless Tx/Rx 156 is configured to communicate with store server 104 and may be configured to communicate with mobile device 102 using one or more wireless near field radio signals and/or communication protocols including, but not limited to NFC (Near Field Communication), RFID (Radio frequency identification), Bluetooth and/or other near field communication protocols. The tag module 158 is configured to manage communication with store server 104 and/or mobile device 102. The tag module 158 is configured to manage purchase state 154 based on the communication. The individual product tag 150 is configured to provide an indication whether the product has been purchased (purchase state 154). For example, the individual product tag 150 may be scanned at a store exit, and may trigger an alarm if the purchase state 154 does not indicate purchased.

For example, the individual product tag 150 may be an RFID tag. For relatively less expensive products, the RFID tag may be configured to indicate whether the product has been purchased. In this example, the individual product tag 150 may include purchase state indicator 154. In another example, for relatively more expensive products, the RFID tag may be configured to uniquely identify product 106 as well as indicate purchase state. In other words, each product in a plurality of the same product (e.g., a specific make and model of a television) may have an RFID tag with a unique product identifier. In this example, the individual product tag 150 may include unique product identifier 152 and purchase state indicator 154.

Security device 160 includes a wireless Tx/Rx 162 and a release module 164. Security device 160 is configured to provide an additional assurance that product 106 has been purchased in a PoS transaction consistent with the present disclosure. Security device 160 may typically be attached to a relatively more expensive product (and/or the product's packaging) and is configured to trigger an alarm if a shopper attempts to remove the security device 160 from the product 106 or remove the product 106 including the security device 160 from the store. Security device 160 is configured to communicate with the store server 104 via wireless Tx/Rx 162 via one or more wireless radio signals that comply and/or are compatible with one or more communication protocols, as described herein. Release module 164 is configured to release an attachment of the security device 160 in response to receiving a release command from the store server 104. Release module 164 may be configured to confirm receipt of the command and/or that the security device 160 has been detached from product 106.

Thus, product 106 includes a product identifier tag 140 configured to identify the product 106 for, e.g., pricing and/or inventory purposes. The product identifier tag 140 may not be unique. Product 106 may include an individual product tag 150 and/or may include a security device 160. The individual product tag 150 is configured to provide an indication whether the product has been purchased (purchase state 154). Whether product 106 includes the individual product tag 150 (and unique product identifier 152) may depend on a relative value of product 106. For relatively more expensive products, product 106 may include security device 160 configured to provide additional assurance that a product leaving a store has, in fact, been purchased. In other words, confirmation of the purchase is represented by release and/or removal of the security device 160.

Mobile device 102 and store server 104 include wireless transmitter/receivers (Tx/Rx) 110 and 134, respectively, circuitry CPU 112 and 130 respectively, and memory 114 and 132, respectively. Mobile device 102 may include one or more sensor(s) 116 and an e-wallet 118. Mobile device 102 and store server 104 are configured to communicate using wireless Tx/Rxs 110, 132. Wireless Tx/Rxs 110 and 132 are configured to transmit and receive one or more wireless radio signals that comply and/or are compatible with one or more communication protocols. As used herein, wireless radio signals and/or communication protocols include but are not limited to NFC (Near Field Communication), RFID (Radio frequency identification), Bluetooth, Wi-Fi, 3G, 4G and/or other communication protocols. Mobile device 102 and store server 104 are configured to communicate via one or more of these communication protocols. CPUs 112 and 130 are configured to perform operations associated with one or more applications included in mobile device 102 and store server 104, respectively.

Sensor(s) 116 are configured to read product tag(s) of a product that a shopper wishes to purchase. Sensor(s) 116 may be configured to read product tag(s) of a product that a customer wishes to return, as described herein. In some embodiments, sensor(s) 116 may be configured to read product and/or store coupons to identify the product associated with the coupon and a discount indicated by the coupon. For example, sensor(s) 116 may include a barcode reader. In another example, sensor(s) 116 may include an RFID tag reader. The e-wallet 118 is configured to store the mobile device user's credit and/or debit card information and may be configured to store banking information. In some embodiments, e-wallet 118 may be configured to store shopper loyalty card information. The e-wallet 118 may be used to perform an electronic purchase transaction that includes payment via stored credit/debit card information.

Memory 114 may include a purchasing application ("app") 120. Store server 104 may include a point of sale (PoS) application 136. The purchasing app 120 is configured to communicate with the store server 104 and PoS application 136 in order to perform automated checkout with point of sale corresponding to the product location. For example, when a shopper wishes to purchase a product, e.g., product 106, he/she may select the product 106, launch the purchasing app 120 and scan the product identifier tag using mobile device 102. The shopper may also scan a manufacturer or store coupon related to the scanned product. Mobile device 102 may communicate with the store server 104 and may provide a product identifier, payment information, coupon, if any, and/or a unique product identifier 152 to store server 104.

The point of sale (PoS) application 136 may confirm the payment information, coupon information, if any, and may then complete the transaction. The PoS application 136 may trigger a change of state of a purchase state 154 of the product 106 via near field wireless Tx/Rx 156 and tag module 158. For example, the PoS application 136 may communicate with the individual product tag 150 to change the purchase state 154 from not purchased to purchased. In another example, the PoS application 136 may provide mobile device 102 a code that purchasing app 120 may then use to communicate with individual product tag 150, configured to change the purchase state 154 from not purchased to purchased. Thus, the purchase state 154 of product 106, uniquely identified by unique product identifier 152, may be changed from not purchased to purchased with point of sale corresponding to the location of the product 106.

The PoS application 136 is configured to provide an electronic purchase receipt 126 to mobile device 102 to indicate completion of the purchase transaction. The mobile device 102 may then display the electronic purchase receipt 124 to the shopper. If the security device is present, the point of sale application 136 may transmit a release command to security device 160 configured to release the security device 160 from the product 106. The shopper may then complete the removal of the security device 160, place the purchased product 106 in his/her cart or basket and safely exit the store with the purchased product 106. Thus, product 106 may be purchased by a shopper where the point of sale corresponds to the product location rather than a centralized checkout register.

Thus, automated product purchasing consistent with the present disclosure may reduce or eliminate time spent in line waiting to checkout and leave the store. A product may be placed in the cart one time while the shopper (and cart) are located adjacent to a shelf that contained the product, i.e., the point of sale. The product may be removed from the cart one time, when the shopper unloads the cart upon or after exiting the store. A point of sale of each product that corresponds to the respective associated product location consistent with the present disclosure may facilitate parallel purchasing by a plurality of shoppers since each shopper may purchase a respective product while other shoppers are purchasing other products. Reducing or eliminating time spent in a checkout line may then result in a relatively better customer experience.

In some situations, a confirmation that at least some of the products in the shopper's cart have been purchased may be performed. For example, an exit device may be configured to scan individual product tag 150 to confirm that the purchase state 154 corresponds to purchased. In another example, a store staff person may ask to review an electronic receipt of at least a portion of a plurality of shoppers prior to their exiting the store. For example, the shoppers may be selected randomly and/or items in the shoppers' carts may be selected randomly. In another example, all shoppers exiting the store with purchased products may be asked to show at least one electronic receipt corresponding to a product in the cart. Although such exit confirmations may be centralized, confirming that a product has been purchased may be faster than performing the operations associated with purchasing a product when the point of sale is a centralized checkout register.

Figure 1B:
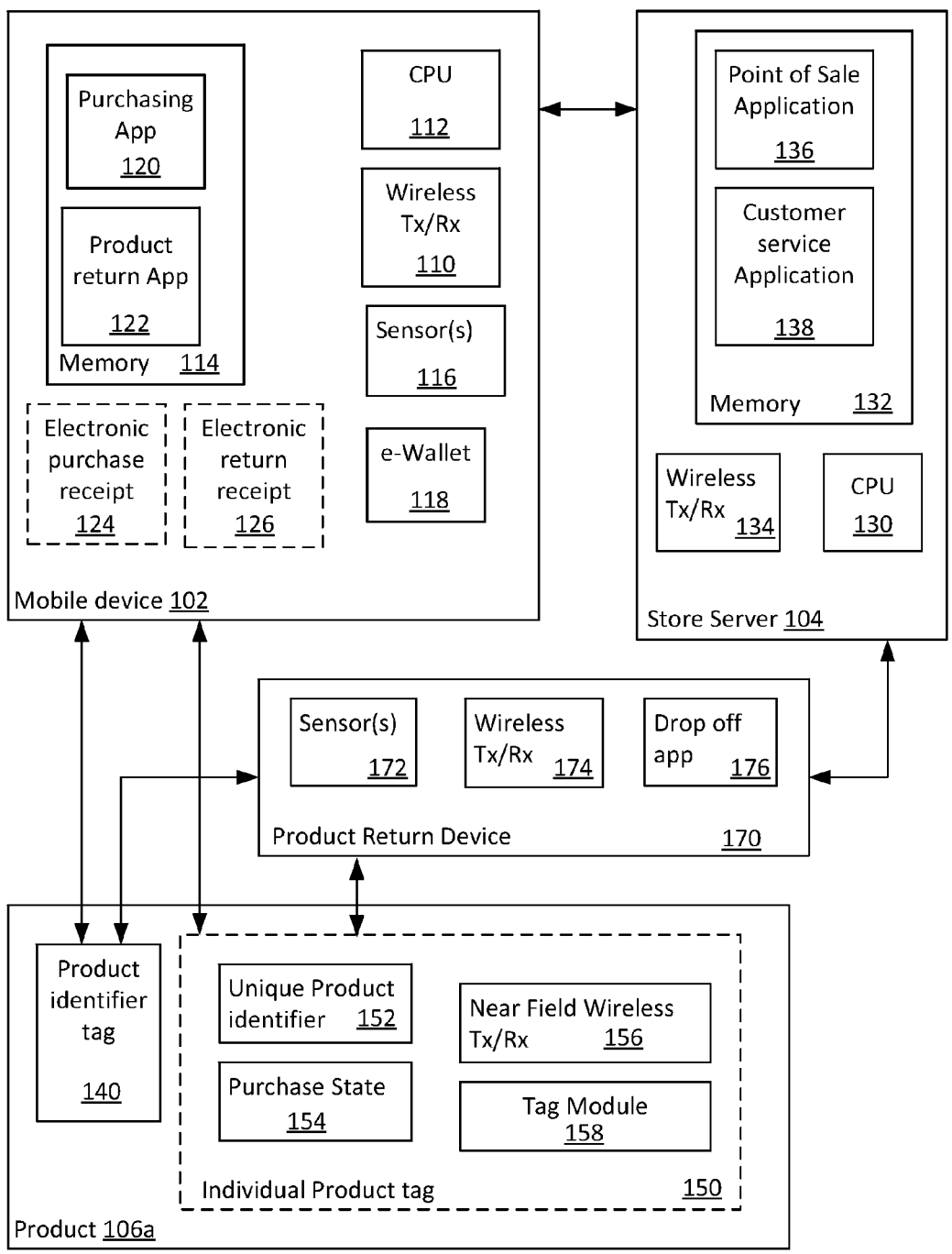
FIG. 1B illustrates an automated product return system consistent with various embodiments of the present disclosure.

FIG. 1B illustrates an automated product return system 101 consistent with various embodiments of the present disclosure. Automated product return system 101 is configured to facilitate automated product return. As used herein, "automated product return" means return of a purchased product where participation of a customer service representative is not required in the return process. The system 101 generally includes mobile device 102, store server 104, product 106a, and a product return device 170. It should be noted that system 100 of FIG. 1A and system 101 of FIG. 1B include common elements with like reference designators. It should be further noted that product 106a may correspond to product 106. In one embodiment, product 106a may not include a security device 160.

The product return device 170 is configured to receive the returned product, e.g., product 106a. The product return device 170 may be located at a product return facility. The product return facility may include the store where the product 106a was purchased and/or a drop-off location configured to accept product returns. Product return device 170 includes one or more sensor(s) 172, a wireless Tx/Rx 174 and a drop-off app 176. The sensor(s) 172 are configured to detect (e.g., scan) product identifier tag 140 and/or unique product identifier 152 to determine the product identifier(s) associated with product 106a. Wireless Tx/Rx 174 is configured to communicate with mobile device 102 and/or store server 104 using one or more wireless communication protocols, as described herein. The drop-off app 176 is configured to manage the product return process for product return device 170.

Mobile device 102 may include a product return app 122 and store server 104 may include a customer service application 138. The product return app 122 is configured to manage the product 106a return for the mobile device 102 and the customer service application is configured to manage the product return for the store server 104.

For example, a customer with a product to return, e.g., product 106a, may bring the product 106a to a drop-off location that includes product return device 170. The customer may launch the product return app 122 on his/her mobile device, e.g., mobile device 102. The customer may then scan the product identifier tag 140 and/or the individual product tag 150 using the mobile device 102 (and sensor(s) 116). The customer may then provide the product 106a to the product return device 170 that may be configured to scan the product identifier tag 140 and/or the individual product tag 150 using sensor(s) 172. The product return app 122 may be configured to communicate with the product return device 170 and/or the store server 104 via the wireless Tx/Rx 110, 174, and/or 134. Product return app 122 and/or drop-off app 176 may notify customer service application 138 of the potential return of product 106a.

Product return device 170 may be further configured to verify that product 106a is in returnable condition. For example, returnable condition may correspond to unopened. In another example, returnable condition may correspond to opened but complete. For example, whether product 106a has been opened may be determined by the presence or absence of a security tape. Product return device 170 may be configured to scan product 106a using, e.g., sensor(s) 172, to detect the presence or absence of the security tape. Additionally or alternatively, a rule may be created that only unopened products may be returned to the drop-off facility and opened products should be returned to the store and/or a customer service entity that includes customer service representatives. Whether product 106a has been opened but is complete may be determined, for example, by weighing product 106a. Additionally or alternatively, sensor(s) 172 may include a vision system configured to determine whether product 106a has been opened and/or whether product 106a appears to be complete.

If product return device 170 verifies that product 106a is in returnable condition, product return device 170 may notify store server 104 (and customer service application 138) and mobile device 102. Customer service application 138 may then apply a credit to the customer's credit, debit or bank account and may provide an electronic return receipt 126 to mobile device 102. The electronic return receipt 126 may be displayed to the customer, confirming that the product 106a has been successfully returned.

Thus, the automated product return system 101 may facilitate returning a purchased product (e.g., product 106a) using a product return device 170 and mobile device 102. Waiting in line for a customer service representative may thus be avoided. In some embodiments, returned products may be limited to unopened products. The product return device 170 may be located at a drop-off location and/or at a store where product 106a was purchased.

Figure 2:
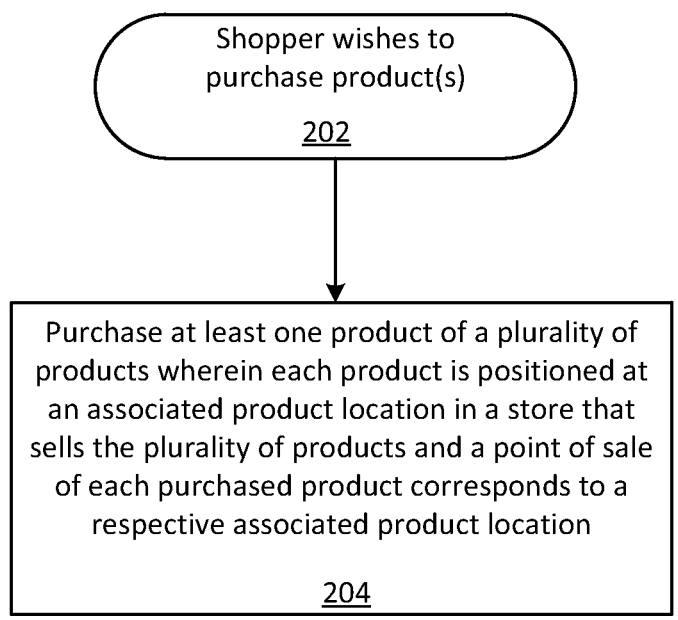
FIG. 2 illustrates a flow chart of exemplary operations of a mobile device consistent with various embodiments of the present disclosure.

FIG. 2 illustrates a flow chart 200 of exemplary operations of a mobile device consistent with various embodiments of the present disclosure. The operations of flow chart 200 may be performed by a mobile device, e.g., mobile device 102. In particular flow chart 200 depicts exemplary operations configured to provide automated checkout where the point of sale of a product corresponds to a location of the product, consistent with the present disclosure.

The operations of flow chart 200 may be initiated 202 by a shopper that wishes to purchase a product. For example, the operations may be initiated by selecting a purchase product icon on a mobile device. Operation 204 may include purchasing at least one or a plurality of products. The plurality of products may be positioned at an associated product location (e.g., store shelf) in a store that sells a plurality of products. A point of sale of each purchased product may correspond to a respective associated product location. Thus, a shopper wishing to purchase a product may purchase the product using his/her mobile device. The purchasing transaction may be completed at a location corresponding to the product location (e.g., adjacent the store shelf that contains the product) and waiting to checkout at a central cash register may be avoided.

Figures 3, 4:
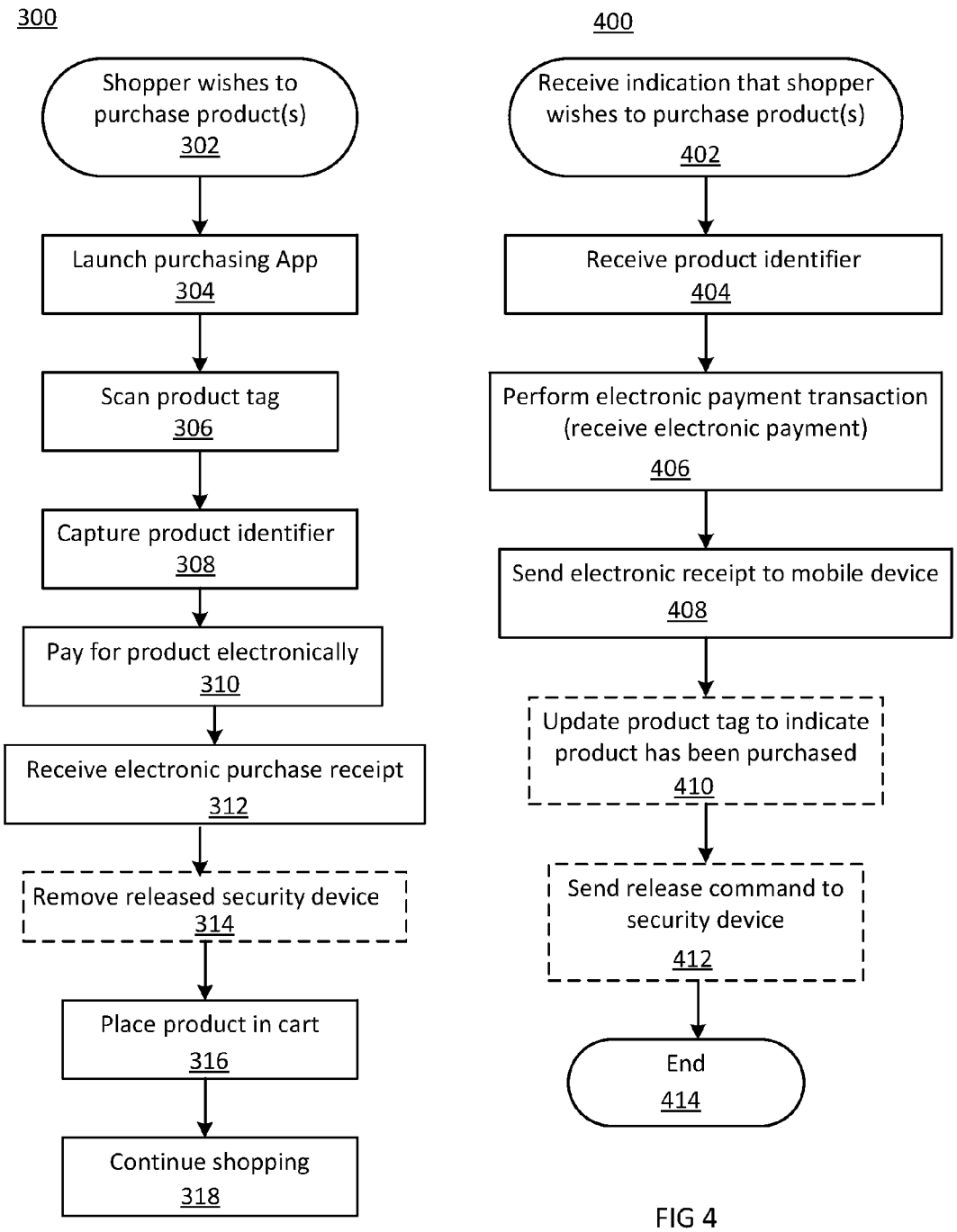
FIG. 3 illustrates a flowchart of exemplary operations of a mobile device configured for point of sale at a product location consistent with an embodiment of the present disclosure.
FIG. 4 illustrates a flowchart of exemplary operations of a store server configured for point of sale at a product location consistent with an embodiment of the present disclosure.

FIG. 3 illustrates a flowchart 300 of exemplary operations for point of sale corresponding to product location consistent with an embodiment of the present disclosure. The operations of flow chart 300 may be performed by a mobile device, e.g., mobile device 102. In particular, flowchart 300 depicts exemplary operations configured to provide automated checkout (i.e., product purchasing where the point of sale corresponds to the product location). The operations of flowchart 300 may be initiated 302 by a shopper that wishes to purchase product(s). Operation 304 may include launching a purchasing app. A product tag may be scanned at operation 306. Operation 308 may include capturing a product identifier. The product may be paid for electronically at operation 310. Operation 312 may include receiving an electronic purchase receipt. If present, a released security device may be removed at operation 314. Operation 316 may include placing product in cart. The shopper may continue shopping at operation 318.

FIG. 4 illustrates a flowchart 400 of exemplary operations for point of sale corresponding to product location consistent with an embodiment of the present disclosure. The operations of flow chart 400 may be performed by a store server, e.g., store server 104. In particular, flowchart 400 depicts exemplary operations configured to provide automated checkout. The operations of flowchart 400 may begin with receiving 402 an indication that a shopper wishes to purchase product(s). A product identifier may be received at operation 404. An electronic payment transaction (e.g., receiving electronic payment) may be performed at operation 406. Operation 408 may include sending an electronic receipt to the mobile device. The product tag may be updated to indicate a purchase of the product at operation 410. Operation 412 may include sending a release command to the security device (for products that include a security device). Program flow may end at operation 414.

FIG. 5 illustrates a flowchart 500 of exemplary operations for automated product return consistent with an embodiment of the present disclosure. The operations of flow chart 500 may be performed by, a mobile device, e.g., mobile device 102. In particular, flowchart 500 depicts exemplary operations configured to provide automated product return. The operations of flowchart 500 may be initiated 502 by a customer that wishes to return a purchased product. Operation 504 may include launching a product return app. At operation 506, a product tag may be scanned. For example, the product tag may be scanned using both the mobile device and the product return device. The electronic credit receipt may be received at operation 508. Program flow may end at operation 510.

FIG. 6 illustrates a flowchart 600 of exemplary operations for automated product return consistent with an embodiment of the present disclosure. The operations of flow chart 600 may be performed by a product return device and/or store server, e.g., product return device 170 and/or store server 104. In particular, flowchart 600 depicts exemplary operations configured to provide automated product return without requiring interaction with a customer service representative. The operations of flowchart 600 may begin with receiving 602 an indication that a customer wishes to return a purchased product. Operation 604 may include waiting for a purchased product to be provided to a product return device. The product return device may be configured to scan a product tag. The product tag may be scanned at operation 606. Scanning the product tag is configured to identify the product to be returned. Whether the purchased product is in returnable condition may be determined at operation 608. If the purchased product is not in returnable condition, the customer may be notified at operation 614. Program flow may end at operation 616. If the purchased product is in returnable condition, an electronic credit receipt may be provided at operation 610. Program flow may then end at operation 612.

While FIGS. 3 through 6 illustrate various operations according to one embodiment, it is to be understood that not all of the operations depicted in FIGS. 3 through 6 are necessary for other embodiments. Indeed, it is fully contemplated herein that in other embodiments of the present disclosure, the operations depicted in FIGS. 3 through 6 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical locations. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

While the foregoing is prided as exemplary system architectures and methodologies, modifications to the present disclosure are possible. For example, memory, e.g., mobile device memory 114 and/or store server memory 132 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system mobile device memory 114 and/or store server memory 132 and/or may comprise other and/or later-developed types of computer-readable memory.

Mobile device 102 may be configured to communicate with a network, store server 104 and/or product return device 170 using a variety of communication protocols. The communications protocols may include but are not limited to wireless communications protocols, such as Wi-Fi, Bluetooth, 3G, 4G, RFID, NFC and/or other communication protocols. The communications protocols may comply and/or or be compatible with other related Internet Engineering Task Force (IETF) standards.

The Wi-Fi protocol may comply or be compatible with the 802.11 standards published by the Institute of Electrical and Electronics Engineers (IEEE), titled "IEEE 802.11-2007 Standard, IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications" published, Mar. 8, 2007, and/or later versions of this standard.

The NFC and/or RFID communication signal and/or protocol may comply or be compatible with one or more NFC and/or RFID standards published by the International Standards Organization (ISO) and/or the International Electrotechnical Commission (IEC), including ISO/IEC 14443, titled: Identification cards—Contactless integrated circuit cards—Proximity cards, published in 2008; ISO/IEC 15693: Identification cards—Contactless integrated circuit cards—Vicinity cards, published in 2006; ISO/IEC 18000, titled: Information technology—Radio frequency identification for item management, published in 2008; and/or ISO/IEC 18092, titled: Information technology—Telecommunications and information exchange between systems—Near Field Communication—Interface and Protocol, published in 2004; and/or related and/or later versions of these standards.

The Bluetooth protocol may comply or be compatible with the 802.15.1 standard published by the IEEE, titled "IEEE 802.15.1-2005 standard, IEEE Standard for Information technology—Telecommunications and information exchange between systems—Local and metropolitan area networks—Specific requirements Part 15.1: Wireless Medium Access Control (MAC) and Physical Layer (PHY) Specifications for Wireless Personal Area Networks (W Pans)", published in 2005, and/or later versions of this standard.

The 3G protocol may comply or be compatible with the International Mobile Telecommunications (IMT) standard published by the International Telecommunication Union (ITU), titled "IMT-2000", published in 2000, and/or later versions of this standard. The 4G protocol may comply or be compatible with IMT standard published by the ITU, titled "IMT-Advanced", published in 2008, and/or later versions of this standard.

Mobile device 102 may be capable of communicating with a network, store server 104 and/or product return device 170 using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Alternatively or additionally, mobile device 102 may be capable of communicating with a network, store server 104 and/or product return device 170 using an X.25 communications protocol. The X.25 communications protocol may comply or be compatible with a standard promulgated by the International Telecommunication Union-Telecommunication Standardization Sector (ITU-T). Alternatively or additionally, mobile device 102 may be capable of communicating with a network, store server 104 and/or product return device 170, using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, mobile device 102 may be capable of communicating with a network, store server 104 and/or product return device 170, using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed connection-oriented network communication protocols are equally contemplated herein.

"Circuitry", as used in any embodiment herein, may comprise, for example, singly or in any combination, hardwired circuitry, programmable circuitry, state machine circuitry, and/or firmware that stores instructions executed by programmable circuitry. An application ("app") and/or module, as used in any embodiment herein, may be embodied as circuitry. The circuitry may be embodied as an integrated circuit, such as an integrated circuit chip.

Thus, the present disclosure provides a method and system for automated check-out (i.e., automated product purchasing) and drop-off return (i.e., automated product return) of products using a mobile device. The method and system are configured to allow a shopper to purchase one or more products using his/her mobile device with a point of sale (PoS) corresponding to a respective location of each purchased product. A common checkout location for all of the plurality of products and the typical associated lines of other shoppers waiting to checkout may thus be avoided. A method and system consistent with the present disclosure may be further configured to facilitate automated drop-off of a product to be returned. Waiting in line for a staff member at a customer service desk may also be avoided.

According to one aspect there is provided a method. The method may include purchasing at least one product of a plurality of products wherein each product is located at a respective associated product location in a store that sells the plurality of products and a point of sale of each purchased product corresponds to the respective associated product location.

According to another aspect there is provided a system. The system may include a mobile device configured to purchase at least one product of a plurality of products wherein each product is located at a respective associated product location in a store that sells the plurality of products and a point of sale of each purchased product corresponds to the respective associated product location.

According to another aspect there is provided a system. The system may include one or more storage mediums having stored thereon, individually or in combination, instructions that when executed by one or more processors result in the following operations including: purchasing at least one product of a plurality of products wherein each product is located at a respective associated product location in a store that sells the plurality of products and a point of sale of each purchased product corresponds to the respective associated product location.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising:
receiving wirelessly, via a customer mobile device having wireless transmit/receive (Tx/Rx) circuitry, a unique identifier that corresponds to a product of a plurality of products, each product of the plurality of products comprising:
  a security device to prevent removal of a respective product from a respective product location in a store that sells the plurality of products,
  tag circuitry to maintain a purchase state of the respective product, and
  near field wireless transmit/receive (Tx/Rx) circuitry for communicating with a mobile device and to receive a command therefrom to adjust the purchase state from not-purchased to purchased;
sending, using the customer mobile device, a signal to a store server to purchase the product and to cause the security device attached to the product to release while the customer mobile device is within near field communication (NFC) range of the product;
receiving, by the customer mobile device, a code indicating the purchase of the product was completed by the store server; and
in response to receiving the code, sending by the customer mobile device, a command based on the received code to the tag circuitry of the product to cause the purchase state of the product to change from not-purchased to purchased.

2. The method of claim 1, wherein each product of the plurality of products is associated with a product identifier tag, the product identifier tag being a same value for a given plurality of products of a same type.

3. The method of claim 1, further comprising:
receiving, by the customer mobile device, an electronic receipt in response to the product being purchased.

4. The method of claim 1, further comprising:
receiving, via the customer mobile device, an electronic credit receipt in response to one purchased product being returned to a product return facility configured to receive returned products if the purchased product is in a returnable condition, wherein the returning is performed without interaction with a customer service representative.

5. The method of claim 2, wherein each product of the plurality of products is associated with an individual product tag comprising unique product identifier, the unique product identifier uniquely identifying a given product and being different than an associated product identifier tag.

6. The method of claim 1, wherein the purchase state of each product of the plurality of products is configured to trigger an alarm when a user attempts to remove an associated security device from a product having a not-purchased purchase state or remove the product having the not-purchased purchase state from a respective product location.

7. The method of claim 1, further comprising:
identifying, by the customer mobile device, the product based on an individual product tag associated with the product.

8. A system, comprising:
a plurality of products, each product of the plurality of products comprising:

a security device to prevent removal of a respective product from a respective product location in a store that sells the plurality of products, tag circuitry to maintain a purchase state of the respective product, and near field wireless transmit/receive (Tx/Rx) circuitry for communicating with a mobile device and to receive a command therefrom to adjust the purchase state from not-purchased to purchased; and a customer mobile device having a processor, memory, and wireless transmit/receive (Tx/Rx) circuitry, the customer mobile device configured to:

receive, via the wireless Tx/Rx circuitry of the customer mobile device, a unique identifier that corresponds to a product of a plurality of products;

in response to receiving the unique identifier, sending via the wireless Tx/Rx circuitry of the customer mobile device a signal to a store server to purchase the product identified by the unique identifier and to cause the security device attached to the product to release while the customer mobile device is within near field (NFC) range of the product;

receiving a code indicating the purchase of the product was completed by the store server; and in response to receiving the code, sending via the Tx/Rx circuitry a command based on the received code to the tag circuitry of the product to cause the purchase state of the product to change from not-purchased to purchased.

9. The system of claim 8, wherein each product of the plurality of products is associated with a product identifier tag, the product identifier tag being a same value for a given plurality of products of a same type.

10. The system of claim 8, wherein the customer mobile device is further configured to receive an electronic credit receipt in response to one purchased product being returned to a product return facility configured to receive returned products if the purchased product is in a returnable condition, wherein the returning is performed using a product return device, without interaction with a customer service representative.

11. The system of claim 9, wherein each product of the plurality of products is associated with an individual product tag comprising unique product identifier, the unique product identifier uniquely identifying a given product and being different than an associated product identifier tag.

12. The system of claim 8, wherein the purchase state of each product of the plurality of products is configured to trigger an alarm when a user attempts to remove an associated security device from a product having a not-purchased purchase state or remove the product having the not-purchased purchase state from a respective product location.

13. The system of claim 8, wherein the customer mobile device is further configured to receive an electronic purchase receipt to display to a user to indicate completion of a purchase transaction.

14. The system of claim 8, wherein the customer mobile device is further configured to receive an electronic return receipt in response to a product being successfully returned.

15. A system comprising one or more non-transitory storage mediums having stored thereon, individually or in combination, instructions that when executed by one or more processors result in operations comprising:

receiving, via wireless transmit/receive (Tx/Rx) circuitry of a customer mobile device, a unique identifier that corresponds to a product of a plurality of products, each product of the plurality of products comprising:

a security device to prevent removal of a respective product from a respective product location in a store that sells the plurality of products, tag circuitry to maintain a purchase state of the respective product, and near field wireless transmit/receive (Tx/Rx) circuitry for communicating with a mobile device and receiving a command therefrom to adjust the purchase state from not-purchased to purchased;

sending, via the wireless Tx/Rx circuitry of the customer mobile device, a signal to a store server to purchase the product and to cause the security device attached to the product to release while the customer mobile device is within near field communication (NFC) range of the product;

receiving, via the wireless Tx/Rx circuitry of the customer mobile device, a code indicating the purchase of the product was completed by the store server; and in response to receiving the code, sending via the wireless Tx/Rx circuitry of the customer mobile device, a command based on the received code to the tag circuitry of the product to cause the purchase state of the product to change from not-purchased to purchased.

16. The system of claim 15, wherein each product of the plurality of products is associated with a product identifier tag, the product identifier tag being a same value for a given plurality of products of a same type.

17. The system of claim 15 wherein the instructions that when executed by one or more processors results in the following additional operations:

receiving an electronic receipt in response to the product being purchased.

18. The system of claim 15, wherein the instructions that when executed by one or more processors results in the following additional operations:

receiving an electronic credit receipt in response to one purchased product being returned to a product return facility configured to receive returned products if the purchased product is in a returnable condition, wherein the returning is performed without interaction with a customer service representative.

\* \* \* \* \*